Nov. 11, 1969  J. F. CHIRUMBOLO  3,478,302
ELECTRICAL CONNECTOR
Filed March 18, 1968
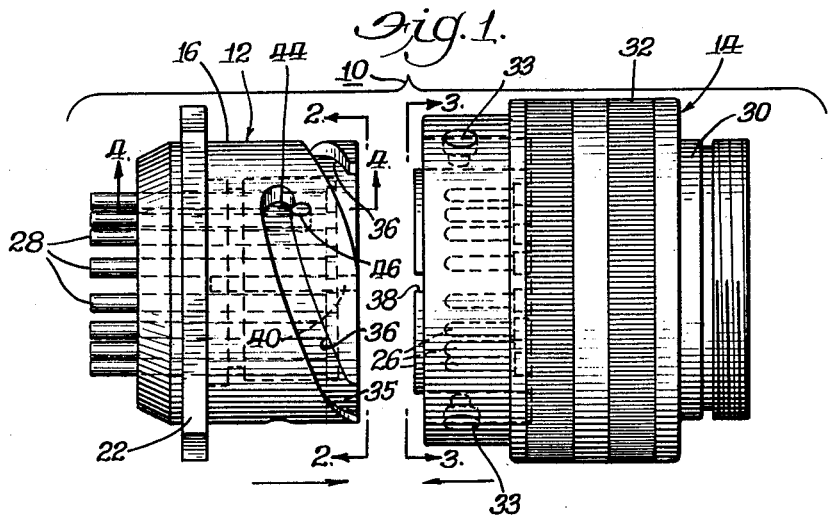
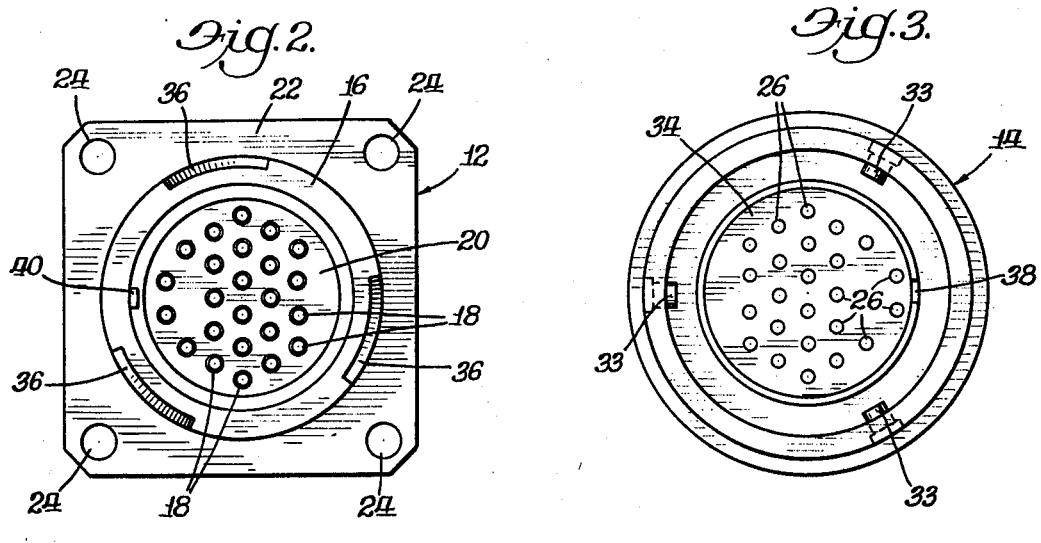
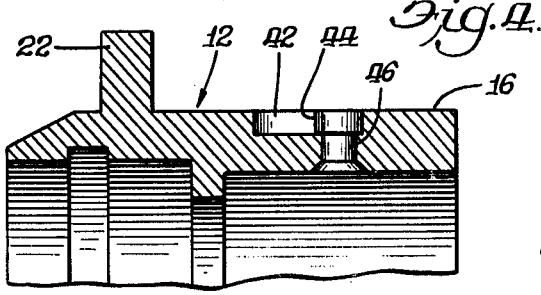
Inventor:
Joseph F. Chirumbolo
By L. F. Hammond
Atty.

United States Patent Office 3,478,302
Patented Nov. 11, 1969

3,478,302
ELECTRICAL CONNECTOR
Joseph F. Chirumbolo, Bellwood, Ill., assignor to The Bunker-Ramo Corporation, a corporation of Delaware
Filed Mar. 18, 1968, Ser. No. 713,673
Int. Cl. H01r 7/32, 33/46; F16l 25/00
U.S. Cl. 339—90
8 Claims

ABSTRACT OF THE DISCLOSURE

An improved electrical connector wherein mating plug and receptacle parts are separably fastened to each other by means of a bayonet-type lock comprised of a plurality of bayonet pins on the plug part and a like number of bayonet slots on the receptacle part. The receptacle part is of one-piece aluminum construction and has stainless steel studs or rods positioned to withstand wear and provide positive locking near the inner ends of the bayonet slots so that the bayonet pins lock behind the stainless steel studs when fully inserted in the bayonet slots.

SUMMARY OF THE INVENTION

It is very desirable in the electrical connector art to construct connector shells out of aluminum as it is light in weight, economical and easy to machine. However, it has been found that aluminum does not have sufficient wear resistance properties to withstand the inherent wear associated with the use of a bayonet lock between connector components. Therefore, commonly used aluminum connector shells have proven to be very unsatisfactory when used in conjunction with a bayonet lock which has experienced frequent coupling and uncoupling. Such wear usually results in an impositive locking and faulty interfacial sealing between the connector components.

A possible solution to this problem is to provide a stainless steel sleeve positioned around the aluminum shell and containing the bayonet slots. Such a stainless steel sleeve would have to be fitted over and staked to the aluminum shell. This method would result in considerable expense both as a result of the difficulty of machining the bayonet slots into the stainless steel sleeve and in the assembly of the sleeve over the shell. The resulting connector structure, although having more resistance to wear, would be heavier and considerably more expensive than an all-aluminum connector shell. Thus, to this point there has been no known inexpensive solution to the problem of providing a connector shell which will resist the wear associated with a bayonet locking means.

Therefore, it is an object of this invention to provide an all-aluminum connector shell assembly for utilizing a bayonet lock but which is adapted to eliminate the inherent wear and the resulting faulty inter-facial sealing associated with bayonet locking means used in conjunction with aluminum shells.

To accomplish this object, a stainless steel rod or stud is positioned near the end of each of the bayonet slots in an aluminum connector shell so that the bayonet pins bear against and snap behind the stainless steel studs when fully inserted in the bayonet slots. Thus, an aluminum receptacle shell is used with the stainless steel studs providing the wear resistance necessary at the points of maximum wear to thereby facilitate the use of a bayonet lock between the mating connector parts and provide acceptable inter-facial sealing.

Other objects, novel features and advantages of this invention will become more readily apparent from the following detailed description when the same is read in connection with the accompanying drawings.

DESCRIPTION OF THE DRAWINGS

To understand more fully the details of the invention, reference may be had to the drawings wherein:

FIGURE 1 is an assembly view of mating receptacle and plug connector parts incorporating the subject invention;

FIGURE 2 is an end view of the receptacle part taken in the direction of lines 2—2 in FIGURE 1;

FIGURE 3 is an end view of the plug part taken in the direction of lines 3—3 in FIGURE 1; and FIGURE 4 is a sectional view of the receptacle part taken in the direction of lines 4—4 in FIGURE 1.

DETAILED DESCRIPTION

More specifically, the drawings show an electrical connector 10 comprised of a mating receptacle 12 and a plug 14. As can be seen in FIGURE 2, the receptacle 12 includes an outer shell 16, a plurality of socket contacts 18 and a hard dielectric 20 surrounding and holding the socket contacts 18. The outer shell 16 includes a mounting flange 22 with four holes 24 cut therethrough to facilitate mounting of the receptacle 12 to a panel (not shown). The basic structure of receptacle 12 is similar to that frequently used in the connector art in that the plurality of socket contacts 18 are arranged and adapted to receive a like number of similarly arranged pin contacts, such as pin contacts 26 on plug 14. The outer end of each of the socket pins 18 is provided with a wire receiving solder well 28 into which the various wires desired to be connected are fastened.

The details of the plug part 14 can best be seen upon reference to FIGURES 1 and 3. The plug 14 includes a shell 30, an outer sleeve 32 and a hard dielectric 34 which holds and surrounds the aforementioned pin contacts 26. The pin contacts 26 are connected to wire receiving members (not shown) similar to the solder wells 28 on the receptacle 12. The sleeve 32 is rotatable relative to the shell 30 and connected thereto by means of a wave washer or sinusoidal spring (not shown).

The receptacle 12 and the plug 14 are secured to each other by means of a bayonet type lock which includes three baynet pins 33 on the outer sleeve 32 of the plug 14 which are positioned to be inserted into three bayonet slots 36 in the receptacle 12. The receptacle 12 and the plug 14 are positioned relative to each other by means of a keyway slot 38 in the plug 14 and a mating keyway pin 40 in the receptacle 12. When the mating parts 12 and 14 are rotated until the keyway pin 40 resides in the keyway slot 38, the bayonet pins 33 are then correctly positioned to enter openings 35 of the bayonet slots 36. The alignment of the keyway pin 40 and the keyway slot 38 guarantees the alignment of the pin contacts 26 with the socket contacts 18 thereby facilitating the proper insertion of the pin contacts 26 into the socket contacts 18 upon attachment of the plug 14 to the receptacle 12.

As can be seen in FIGURE 1, the bayonet slot 36 curves inwardly and terminates in a bayonet pin-receiving pocket 42. For purposes of positive locking of bayonet pin 33 in bayonet socket 36, it is important to maintain a small raised portion 44 at the entrance to the bayonet pin-receiving pocket 42. It is this raised portion 44 which is most susceptible to wear upon insertion and retraction of the bayonet pins 33 from the bayonet sockets 36 and, therefore, when constructed of aluminum it deteriorates quickly due to wear thereby eliminating the positive locking feature of the bayonet-locking mechanism. Thus, in accordance with this invention, a stainless steel rod or stud 46 is placed adjacent to the bayonet slot 36 in order to provide this raised portion 44 in the entrance to the bayonet pin-receiving socket 42. Thus, the stainless steel studs 46 are positioned at the point of maximum wear and, due to their high wear resistance properties, they maintain the raised portion 44 to insure proper positive locking of the bayonet pins 34 within the bayonet slots 36.

Thus, it can readily be seen that when the keyway pin 40 and the keyway slot 38 are keyed together, the pin contacts 18 are properly aligned to be inserted into the socket contacts 26. At this point, the receptacle shell 16 and the plug shell 30 and the respective contact pins 26 and contact socket 18 are keyed together and cannot be rotated relative to each other. However, the sleeve 32, which contains the bayonet pins 33, is rotatable relative to the other keyed together components, and operates against the aforementioned wave washer (not shown). As the sleeve 32 is rotated, the bayonet pins 33 move up the bayonet slots 36 towards the pockets 42 and accordingly, the pin contacts 26 become fully inserted and seated within the socket contacts 18. The final step in the connection occurs when the bayonet pins 33 snap beyond the stainless steel studs 46 into the pockets 42 to thereby accomplish a locking of the receptacle 12 and the plug 14 together to form an assembled connector 10.

It thus can be seen that the use of the stainless steel studs 46 as the raised portions 44 adjacent to the pockets 42 eliminates the disadvantages associated with the use of low wear resistance aluminum in this area to thereby facilitate the frequent coupling and uncoupling of the plug and receptacle while still maintaining a desirable positive locking associated with a bayonet type coupling.

Although but one preferred embodiment of the subject invention has been shown and described in detail, it should be obvious to those skilled in the art to which it pertains, that many changes and modifications may be made thereto without departing from the scope of the invention.

I claim:

1. An electrical connector having two component parts separably held together by means of a bayonet lock comprising a plurality of bayonet pins extending radially inward from one connector part, a like number of bayonet slots in the other connector part, and a stud of wear-resistant metal positioned in each of said bayonet slots to provide positive locking of the bayonet pins within the bayonet slots.

2. An electrical connector as set forth in claim 1 wherein said one connector part is a plug containing pin contacts and said other connector part is a receptacle containing socket contacts adapted to mate with the pin contacts.

3. An electrical connector as set forth in claim 2 wherein said plug and receptacle connector parts are formed of a lightweight metal.

4. An electrical connector as set forth in claim 3 wherein said plug and receptacle connector parts are formed of aluminum and said studs are formed of stainless steel.

5. An electrical connector as set forth in claim 2 wherein said socket contact containing receptacle includes a hard dielectric body surrounding and holding the socket contacts, a shell portion having a keyway slot at its forward end, and an outer sleeve rotatable relative to said shell and having said bayonet pins extending radially inward therefrom.

6. An electrical connector as set forth in claim 5 wherein said pin contact containing plug includes a hard dielectric body surrounding and holding the pin contacts and a shell portion having a keyway pin adapted to mate with the keyway slot in the receptacle to facilitate alignment of the plug and receptacle for coupling.

7. An electrical connector as set forth in claim 6 wherein said bayonet slots in said receptacle terminate in pin receiving pockets, the studs being positioned adjacent to said receiving pockets in said bayonet slots to provide a raised wear resistant portion to provide positive locking of the bayonet pins in the receiving pockets.

8. An electrical connector as set forth in claim 7 wherein said plug and receptacle connector parts are formed of aluminum and said studs are formed of stainless steel.

References Cited

UNITED STATES PATENTS

| | | |
|---|---|---|
| 2,391,288 | 12/1945 | Barlow. |
| 2,395,695 | 2/1946 | Summers. |
| 2,961,630 | 11/1960 | Duncan _____ 339—90 |

MARVIN A. CHAMPION, Primary Examiner

J. H. McGLYNN, Assistant Examiner

U.S. Cl. X.R.

24—221; 285—16, 396; 287—103; 339—188